United States Patent [19]

Spevack

[11] Patent Number: 4,469,668
[45] Date of Patent: Sep. 4, 1984

[54] INTEGRATED SYSTEM FOR POLLUTION ABATEMENT AND ENERGY DERIVATION FROM GEOTHERMAL STEAM

[76] Inventor: Jerome S. Spevack, 160 W. Pinebrook Dr., New Rochelle, N.Y. 10804

[21] Appl. No.: 343,911

[22] Filed: Jan. 29, 1982

[51] Int. Cl.³ .................... C01B 17/02; C01B 17/16; C01B 31/20

[52] U.S. Cl. ........................ 423/573 R; 423/224; 423/225; 423/226; 423/234; 423/237; 423/561 R; 423/DIG. 19; 60/641.2

[58] Field of Search .............. 75/7, 9; 423/222, 224, 423/225, 233, 234, 237, 563, 566, 573 G, 574 L, DIG. 19, 561 R, 47, 151, 152, 542; 60/641.2

[56] References Cited

U.S. PATENT DOCUMENTS

| | | | |
|---|---|---|---|
| 1,925,198 | 9/1933 | Melvill | 423/574 L |
| 2,021,865 | 11/1935 | Lincoln | 423/574 L |
| 2,043,084 | 6/1936 | Ward et al. | 423/574 L |
| 3,028,295 | 4/1962 | Trobeck et al. | 423/224 |
| 3,709,976 | 1/1973 | Tarhan | 423/574 G |
| 3,787,559 | 1/1974 | Rudolph et al. | 423/422 |
| 3,812,236 | 5/1974 | Adams et al. | 423/237 |
| 3,876,756 | 4/1975 | Romantshuk et al. | 423/574 L |
| 4,072,740 | 2/1978 | Spevack | 423/563 |
| 4,123,506 | 10/1978 | Spevack | 423/566 |
| 4,146,569 | 3/1979 | Giammarco et al. | 423/222 |
| 4,192,854 | 3/1980 | Harvey et al. | 423/566 |
| 4,202,864 | 5/1980 | Spevack | 423/566 |
| 4,218,431 | 8/1980 | Spevack | 423/563 |
| 4,259,300 | 3/1981 | Lieffers | 423/573 G |
| 4,293,531 | 10/1981 | Field et al. | 423/233 |
| 4,361,487 | 11/1982 | Hills et al. | 423/224 |

OTHER PUBLICATIONS

Laszlo, J., Application of the Stretford Process for H₂S Abatement at Geysers Geothermal Power Plant, 11th Interscience Energy Conversion Engineering Conference, 1976.

Weinberg, C. J., The Geysers Power Plant H₂S Abatement Research and Development, Geothermal Energy Magazine, vol. 7, #6, Jun. 1979, pp. 42–43.

Primary Examiner—Gary P. Straub

[57] ABSTRACT

An integrated system for the derivation of useful energy from impure steam and/or for use in connection therewith, said steam containing both hydrogen sulfide and an alkaline acting component, such as ammonia, while producing liquid-phase and gaseous-phase effluents from condensation of the impure steam and substantially reducing the emission of sulfur-containing compounds to the environment. Treatment of such effluents to selectively react or bind alkaline acting components in the liquid-phase results in an augmented concentration of hydrogen sulfide in the gaseous-phase and its depletion in the liquid-phase. The gaseous-phase comprising noncondensable gas contaminants and uncondensed water vapor is separated from the liquid-phase steam condensate and treated to remove hydrogen sulfide to produce an environmentally acceptable vent gas which in part is employed in said treatment of the liquid-phase effluent.

26 Claims, 4 Drawing Figures

INTEGRATED SYSTEM FOR POLLUTION ABATEMENT AND ENERGY DERIVATION FROM GEOTHERMAL STEAM

BACKGROUND OF THE INVENTION

1. Field of the Invention

This invention relates to the derivation of useful energy from impure steam containing hydrogen sulfide, and more particularly to the reduction of emissions of sulfur-containing compounds to the environment as a result of or in connection with the derivation of useful energy from impure steam which contains both hydrogen sulfide and an alkaline acting component.

2. Description of the Prior Art

Useful energy such as heat, mechanical power and electricity can be derived from geothermal resources by obtaining geothermal steam and/or aqueous geothermal liquids from a subterranean geothermal reservoir and processing the geothermal fluid in surface facilities to extract thermal energy therefrom. Of particular interest is the generation of electricity by passing geothermal steam through a steam turbine/generator.

Most geothermal fluids, particularly those in the gaseous state, contain appreciable quantities of noncondensable gases comprising gaseous compounds such as hydrogen sulfide, carbon dioxide, ammonia, nitrogen, hydrogen, methane, boric acid, other substances comprising boron, arsenic or mercury, and the like. The presence of hydrogen sulfide in the geothermal fluid used for the derivation of useful energy often poses an environmental problem because only small amounts of hydrogen sulfide can be acceptably discharged into the atmosphere or hydrosphere.

Various processing procedures have been proposed for the abatement of hydrogen sulfide emissions resulting from or in connection with the derivation of useful energy from geothermal resources. One proposed method involves treating the motive geothermal steam upstream of the turbine to reduce the hydrogen sulfide content of the steam and then deriving useful energy from this pretreated geothermal steam. Such upstream pretreatment methods are disclosed in U.S. Pat. Nos. 4,123,506, 4,202,864 and 4,242,305 to Spevack and U.S. Pat. No. 4,163,044 to Woertz. Other proposed methods involve treating only the noncondensable gases separated from the steam turbine and condenser effluents to remove hydrogen sulfide from the downstream gases by means of conventional hydrogen sulfide removal processes, such as the Stretford process, before discharging the gases to the atmosphere. Such downstream gas treatment conventional processes are capable of converting large fractions of the hydrogen sulfide in the gases treated to elemental sulfur or other useful sulfur-containing compounds. It has been found, however, that particularly where the impure steam contains an alkaline acting component, e.g. ammonia, a substantial fraction of the hydrogen sulfide in the effluents from the steam turbine and/or condenser will not readily separate into the gaseous-phase with the other noncondensable gases but will dissolve in the liquid-phase with the steam condensate and, as a result, this substantial fraction of the hydrogen sulfide bypasses the downstream gas treatment process and is eventually emitted to the environment from the liquid-phase steam condensate. Various methods have been proposed to chemically treat the effluents from the steam turbine and/or condenser to convert the hydrogen sulfide therein to sulfur, sulfates or other oxidation products, for example: by addition of a noncatalytic oxidant such as hydrogen peroxide; or by use of an aqueous-phase oxidation catalyst such as a ferric salt or a chelated ferric salt with air or oxygen; or to convert dissolved hydrogen sulfide to an insoluble metal sulfide by the process of U.S. Pat. No. 4,218,431 to Spevack.

A method directed to eliminate the need to chemically react the hydrogen sulfide dissolved in the steam condensate in a system deriving useful energy from geothermal steam has been proposed in U.S. Pat. No. 4,259,300 to Lieffers, which employs an upstream acid treatment of the impure steam for removal of alkaline acting components, e.g. ammonia, such as by the treatment disclosed in U.S. Pat. No. 4,123,506 to Spevack, in combination with conventional downstream processes for removing hydrogen sulfide from the noncondensable gases separated from the steam turbine and condenser effluents. In the Lieffers method, because the alkaline acting components are removed from the impure steam upstream of the turbine, the hydrogen sulfide will pass through the turbine and condenser and tend to concentrate in the effluent gaseous-phase together with the other noncondensable gases and uncondensed water vapor. Thus effluent gaseous-phase, which is easily separated from the aqueous or liquid-phase steam condensate effluent after derivation of energy from the impure steam, is treated by a conventional process for removing hydrogen sulfide from gases such as noted above. The Lieffers method, however, involves acid treatment of the entire supply of impure steam, which constitutes a large volume at high temperature and pressure, with consequent high operating cost and high equipment cost due to increased potential corrosion and other upstream operating requirements. Furthermore, the upstream removal of alkaline acting components from the impure steam without upstream removal of hydrogen sulfide, as disclosed in said U.S. Pat. No. 4,123,506, renders the impure steam flow substantially more corrosive to the downstream turbine and condenser equipment, thereby also increasing plant maintanance costs and reducing energy productivity.

A primary object of the present invention is to provide improved process and apparatus for reducing the emission of sulfur-containing compounds to the environment from the utilization of hydrogen sulfide-containing impure steam comprising alkaline acting components, e.g. ammonia, in connection with the derivation of useful energy therefrom.

Another object of the present invention is to provide simple but effective process and apparatus by which the emission of sulfide-containing compounds to the environment from facilities used in connection with the generation of electricity from geothermal steam containing ammonia is abated by a novel combination employing known process steps or means for removing hydrogen sulfide from hydrogen sulfide-containing gases.

Still another object of the present invention is to provide integrated energy derivation and pollution abatement process and apparatus by which useful energy can be efficiently derived from hydrogen sulfide-containing impure steam comprising ammonia while substantially reducing the emission of sulfur-containing compounds to the environment.

Additional objects of the present invention are to achieve one or more of the foregoing objects by employing novel combinations embodying chemical and physical processes downstream of the turbine and condenser, which avoid the disadvantages of the Lieffers upstream ammonia removal method. It is intended to achieve such objects by retaining alkaline acting components, e.g. ammonia, in the impure steam passing through the turbine and/or condenser, by eliminating the need for special large volume and high temperature and pressure equipment required for upstream impure steam treatment, and by effecting downstream treatment of the liquid-phase steam condensate to cause dissolved hydrogen sulfide to transfer from the liquid into the gaseous-phase effluent. The present invention thus permits substantially all of the hydrogen sulfide originally present in the impure steam to be reacted and removed by means of conventional processes for removing hydrogen sulfide from gases at relatively low temperature and pressure without any reduction in the available energy content of the impure steam, and thereby provide for the product of useful energy from impure steam with efficient pollution abatement at reasonable cost.

Further objects, advantages and features of the present invention will become apparent to those skilled in the art from the following description of preferred embodiments thereof taken in conjunction with the accompanying drawings.

SUMMARY OF THE INVENTION

Briefly, the invention provides a novel integrated process and apparatus for use directly or indirectly in the derivation of useful energy from impure steam which contains both hydrogen sulfide and one or more alkaline acting components, e.g. ammonia, while substantially reducing the emission of sulfur-containing compounds to the environment, i.e. the atmosphere and/or the hydrosphere.

Useful energy is derived from such impure steam by expansion and condensation of steam with the formation of a two-phase fluid effluent containing said hydrogen sulfide and alkaline acting components. Said two-phase fluid consisting of an aqueous or liquid-phase comprising steam condensate with dissolved gases and a gaseous-phase comprising noncondensable gases with uncondensed water vapor. The liquid-phase effluent formed from the impure steam during and/or subsequent to said energy derivation is treated with an acidic substance, e.g. an acid, to selectively remove the alkaline acting components therein by chemically reacting with or binding the same without any significant reaction with the hydrogen sulfide. By so removing alkaline acting components in the liquid-phase, dissolved hydrogen sulfide is caused to be released from solution and transferred into the gaseous-phase, which may then be readily separated from said liquid-phase effluent. This gaseous-phase effluent, which is usually small in volume compared to the volume of the impure steam employed for the derivation of useful energy and is at a substantially lower temperature and pressure, is then treated to chemically react the hydrogen sulfide therein and produce a treated gas of reduced hydrogen sulfide content. At least a portion of the treated gas is vented to the atmosphere. Preferably, the said liquid-phase effluent alone, rather than the said two-phase fluid is treated with a suitable aqueous acid and/or water soluble acid gas to selectively react with or bind the alkaline acting components in the liquid-phase as aforesaid.

The amount of alkaline acting components which are chemically reacted or bound in the liquid-phase by said acid treatment is controlled such that the gaseous-phase separated from the liquid-phase contains a desired substantial portion, e.g. 80 percent or more, of the total hydrogen sulfide in the raw impure steam. This concentration of the hydrogen sulfide in said gaseous-phase allows a substantial reduction in the overall emissions of hydrogen sulfide to be achieved using known methods for its removal from gas streams. Further, by the present invention, such substantial reduction in emissions is achieved at a minimum of chemical cost and without any reduction in the amount of useful energy derived from the raw impure steam. In addition, by retaining the alkaline acting components, e.g. ammonia, in the impure steam during its passage through the turbine and/or associated equipment, corrosion of the equipment is reduced and the efficiency of condensation of the steam is improved. The present invention is particularly suited for abatement of hydrogen sulfide emissions in connection with the generation of electricity from geothermal steam.

BRIEF DESCRIPTION OF THE DRAWINGS

The present invention will be more readily understood by reference to the drawings in which FIGS. 1, 2, 3 and 4 are schematic flow diagrams illustrating preferred embodiments of the invention. For simplicity, illustration of all pumps, valves and controls have been omitted as their need and use at various locations will be apparent and readily understood to persons of ordinary skill in the art.

DETAILED DESCRIPTION OF THE INVENTION

The present invention is applicable for use in connection with the derivation of useful energy from impure steam which contains both hydrogen sulfide and one or more alkaline acting components, e.g. ammonia. As used herein, the term "alkaline acting component" means a chemical substance which, when dissolved in pure water, forms an aqueous alkaline solution capable of absorbing acid gases such as hydrogen sulfide and/or carbon dioxide and/or sulfur dioxide. The process and apparatus of this invention are particularly adapted for use in connection with the derivation of useful energy from geothermal steam containing both hydrogen sulfide and ammonia, such as the geothermal steam obtained from The Geysers' dry geothermal steam reservoir in California or the geothermal steam which is obtained from hydrothermal reservoirs containing geothermal brines. This invention is also applicable to a wide variety of energy derivation systems including those using the thermal energy of the steam for space or process heating and those using steam in a turbine or other prime mover to produce mechanical energy. Steam driven engines other than steam turbines may also be used and wherever the term "turbine" appears herein it is intended to include all types of steam and/or gas driven engines.

This invention is particularly suited for use in connection with the derivation of useful energy using impure steam containing hydrogen sulfide and one or more alkaline acting components. While the invention will hereinafter be described with respect to the generation of electricity using geothermal steam, the invention is not so limited and may be employed using an impure steam from any natural or industrial source providing it contains both hydrogen sulfide and one or more alkaline acting components, and it may be employed for purposes which include condensation of the steam other than in connection with the generation of electricity.

Geothermal steam obtained at The Geysers is exemplary of an impure steam which can be employed in embodiments of this invention. The geothermal steam from The Geysers is reported to typically contain between about 0.1 and about 3.4 weight percent of non-condensable gases with the ranges of concentration and average concentrations of principal individual gases contaminants as indicated in the following table:

TABLE

| Gas | Parts per million by Weight | |
|---|---|---|
| | Range | Average |
| Carbon Dioxide | 290–30,600 | 3,260 |
| Hydrogen Sulfide | 5–1,060 | 222 |
| Methane | 13–1,447 | 194 |
| Ammonia | 9–1,060 | 194 |
| Nitrogen | 6–638 | 52 |
| Hydrogen | 11–218 | 56 |

In addition, such geothermal steams may contain small amounts of other gaseous contaminants, e.g. boric acid, substances comprising arsenic or mercury, hydrocarbons, argon, etc. and usually are devoid of free oxygen. While The Geysers' geothermal steam is exemplary of an impure steam which can be employed by the present invention, other inpure steams containing substantially higher or lower percentages of the indicated, as well as other, contaminants may also be employed.

In conventional practice, geothermal steam containing hydrogen sulfide and ammonia is passed through a turbine to derive useful energy and the effluents from the turbine are cooled, usually at subatmospheric pressure, by heat exchange with cool water in a direct contact condenser or a surface condenser to condense substantially all of the steam therein and thereby form a two-phase effluent comprising a liquid-phase of steam condensate with dissolved gases and a gaseous-phase with uncondensed water vapor. Under commercial operating conditions it can be expected that a substantial portion of both the ammonia and the hydrogen sulfide will be contained in the liquid-phase. It has been reported that, typically, about 35 percent of the total hydrogen sulfide in the raw impure steam will be dissolved in the liquid-phase when a surface condenser is employed to condense the effluent from the turbine and as much as 85 percent or more of the hydrogen sulfide in the raw impure steam will be dissolved in the liquid-phase when a direct contact condenser is employed. This substantial portion of the hydrogen sulfide in the liquid-phase bypasses treatment by any gaseous-phase hydrogen sulfide abatement process and thus is typically emitted to the atmosphere when dissolved hydrogen sulfide is released from the liquid-phase, such as during the evaporative cooling of the liquid-phase in a cooling tower for recycle as cooling water. Although the liquid-phase could be chemically treated as aforesaid to react with and thereby remove the dissolved hydrogen sulfide therein, the treatment methods which have been reported are either unsatisfactory or may not be economically competitive with that of the present invention.

I have found that in the presence of an alkaline acting component, hereinafter exemplified by ammonia, the hydrogen sulfide dissolved in the liquid-phase turbine and condenser effluents is loosely chemically bound, e.g. as ammonium sulfide $((NH_4)_2S)$ and/or ammonium hydrosulfide $(NH_4HS)$, and that it can be released and transferred from the liquid-phase into the gaseous-phase. Such release and transfer is accomplished by selectively chemically reacting or binding the ammonia with an anion component different from the sulfide anions by addition of an aqueous acid and/or acid gas to said liquid-phase. For example, of a highly ionized acid, e.g. sulfuric acid, is added, the following reaction may be contemplated:

$$NH_4HS + H_2SO_4 = NH_4HSO_4 + H_2S$$

and if an acid gas, e.g. carbon dioxide, which forms a weakly ionized acid in water, e.g. carbonic acid, is added in sufficient quantity, the following reaction may be contemplated:

$$NH_4HS + H_2CO_3 = NH_4HCO_3 + H_2S$$

Such selective chemical acidic treatment serves to release hydrogen sulfide from the liquid-phase and allow it to transfer into the gaseous-phase directly and/or with the aid of countercurrent gas stripping. After the hydrogen sulfide has transferred into the gaseous-phase it can be conveniently treated by a known hydrogen sulfide abatement process. Through proper selection of the acidic treatment conditions, it is possible to reduce the amount of hydrogen sulfide in the liquid-phase to 20 percent or less of the total hydrogen sulfide in the two-phase effluent from the turbine and condenser, preferably 10 percent or less. Under typical operating conditions of such acidic treatment, the amount of hydrogen sulfide in the liquid-phase may, if desired, be reduced to about 5 percent of the total hydrogen sulfide in the effluents from the turbine and condenser when a direct contact condenser is employed and may be reduced to about 1 percent of such total hydrogen sulfide when a surface condenser is employed. However, it may be desirable for economic reasons, or as a practical matter, to react less than all of the ammonia in the liquid-phase by said acid treatment. Preferably, the amount of ammonia treated by such acid treatment is selected so that at least 80 percent of said total hydrogen sulfide is concentrated in the gaseous-phase, more preferably at least about 90 percent.

In accordance with the present invention, the liquid-phase is treated by addition of an aqueous acid solution and/or by contact with an acid gas. The aqueous acid solution may comprise one or more acidic substances and may contain various nonreactive salts, such as the ammonium salts of said acids formed by reaction of the ammonia therewith. As used herein, the term "acid substance" means a compound which dissolves in water and dissociates to yield hydronium ions and anions of said acid, does not volatilize or decompose under the conditions of said liquid-phase acid treatment and does not react to a material extent with hydrogen sulfide. Furthermore, the said acid must be capable of forming water-soluble ammonium salts which are stable in solution at the conditions employed in said liquid-phase acid treatment. Suitable acidic substances include both inorganic acids, e.g. sulfuric acid, sulfurous acid, phosphoric acid, hydrochloric acid and the like, and organic acids, e.g. glycollic acid, citric acid and the like. The concentration of the acid substance and the rate of supply of the acid solution thereof to said acid treatment will be adjusted, depending on the concentration of ammonia in the liquid-phase and the flow rate of the turbine and condenser effluents, to achieve chemical reaction or binding of the desired amount of ammonia and release of the desired amount of hydrogen sulfide from the liquid-phase into the gaseous-phase.

The aqueous acid solution may also contain various other compounds providing they do not interfere with the reaction or binding of the ammonia and do not react to a material extent with hydrogen sulfide. For example, minor amounts of a corrosion inhibitor or a chelating agent or other agent may be advatageously added to the acid solution.

Figure 1:
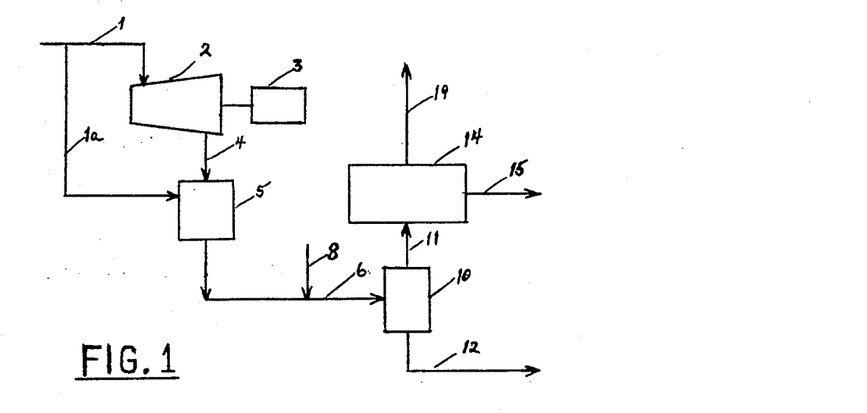

Referring to the embodiment of the invention illustrated in FIG. 1, impure steam, e.g. geothermal steam, at superatmospheric pressure and containing both hydrogen sulfide and ammonia is conducted through conduit 1 into the inlet of steam turbine 2. In passage through turbine 2, the impure steam is expanded and cooled and a portion of the steam may be condensed to form steam condensate. Passage of the impure steam through turbine 2 provides the motive power to turn generator 3 thereby generating electricity. The effluent from turbine 2 is conducted through conduit 4 to condenser 5 wherein the effluent is further cooled to condense additional steam and reduce back pressure on the turbine. Alternatively, such impure steam may not be employed to produce motive power but may be conducted in whole or in part to condenser 5 via conduit 1a for some other purpose, e.g. to maintain a flow of geothermal fluid in the geothermal well during periods of emergency or planned turbine shut-down for utilizing energy of said flow to maintain the temperature and physical stability of the well. Condenser 5 may be a direct contact type condenser in which the steam is condensed by direct contact with a stream of cold water (not shown) or it may be a surface condenser in which the steam is condensed by indirect heat exchange with a cold fluid, e.g. cooling tower water (not shown). The two-phase fluid effluent from condenser 5, comprising a liquid-phase effluent of steam condensate with dissolved gases and a gaseous-phase effluent of noncondensable gases with uncondensed water vapor, is passed through conduit 6 into vapor/liquid separator 10. A suitable aqueous acid solution of is introduced via conduit 8 into conduit 6 wherein it mixes with said two-phase fluid and selectively reacts with or binds the ammonia therein while releasing hydrogen sulfide. Devices such as baffles or static mixing elements may be incorporated in conduit 6 to enhance mixing. The liquid-phase effluent containing ammonia bound in the form of water soluble ammonium salts of said nonvolatile acid substance is separated from the gaseous-phase effluent in separator 10 after such acid treatment. Separator 10 can be any conventional vapor/liquid separator and may be operated at reduced superatmospheric pressure, atmospheric pressure or subatmospheric pressure to accomodate particular engineering requirements. Although separator 10 is illustrated as a vessel separate from condenser 5, condenser 5 and separator 10 can be a single integrated vessel. Preferably, condenser 5 and separator 10 are operated at subatmospheric pressure and a suitable gas pumping device, e.g. a steam ejector, (not shown) is used to withdraw the noncondensable gases and uncondensed water vapor from separator 10. As a result of said acid treatment, a substantial portion of the dissolved hydrogen sulfide will be transferred from the liquid-phase into the gaseous-phase and conducted from separator 10 through conduit 11. The acid treated liquid-phase of steam condensate which now contains only a minor portion of the hydrogen sulfide which was previously therein is conducted from separator 10 through conduit 12 for use (not shown), e.g. as cooling tower water make-up, for recovery of the ammonium salts therein, for recovery of usable water, and/or for suitable surface or subterranean disposal.

The hydrogen sulfide-containing gaseous-phase from separator 10 is conducted through conduit 11 to a selected process for removal of hydrogen sulfide, indicated by processor 14. Such hydrogen sulfide removal process, directly or indirectly, converts the hydrogen sulfide into a separable reaction product, e.g. elemental sulfur or solid metal sulfide, which is then removed from processor 14 as indicated at 15. In the embodiment illustrated in FIG. 1, processor 14 removes sufficient hydrogen sulfide from the gaseous-phase so as to produce a vent gas of noncondensable gases with an acceptably low hydrogen sulfide content which may be vented through conduit 19 to the atmosphere.

Various of the known processes for removing hydrogen sulfide from gas streams containing the same can be employed by processor 14 in embodiments of the present invention for removing hydrogen sulfide from the gaseous-phase delivered by conduit 11. Among the processes which are suitable for such use as those in which hydrogen sulfide is absorbed from the gas stream by contact with an aqueous regenerable washing solution and the absorbed hydrogen sulfide is converted primarily to elemental sulfur as reaction product, such as the Stretford process. Other oxidation processes may also be employed, such as those in which hydrogen sulfide-containing gases are treated in one or more stages to catalytically oxidize the hydrogen sulfide to elemental sulfur and/or to oxidize it to sulfur dioxide and/or sulfur trioxide which can be absorbed in water to form sulfurous and/or sulfuric acid solutions. Other suitable processes include those in which hydrogen sulfide-containing gases are treated with an aqueous dispersion of a metal compound, e.g. a soluble metal salt, the metal of which can form a relatively insoluble metal sulfide, more particularly those metal sulfides having a solubility product at 25° C. smaller than $10 \times 10^{-15}$ such as compounds of iron, nickel, zinc, copper, etc. In such processes the hydrogen sulfide from the gas is caused to transfer into the aqueous liquid and chemically react with said metal compound to form a solid metal sulfide reaction product which is separable from the liquid and, if desired, such solid sulfide may in turn be chemically treated to regenerate the metal compound for reuse.

Figure 2:
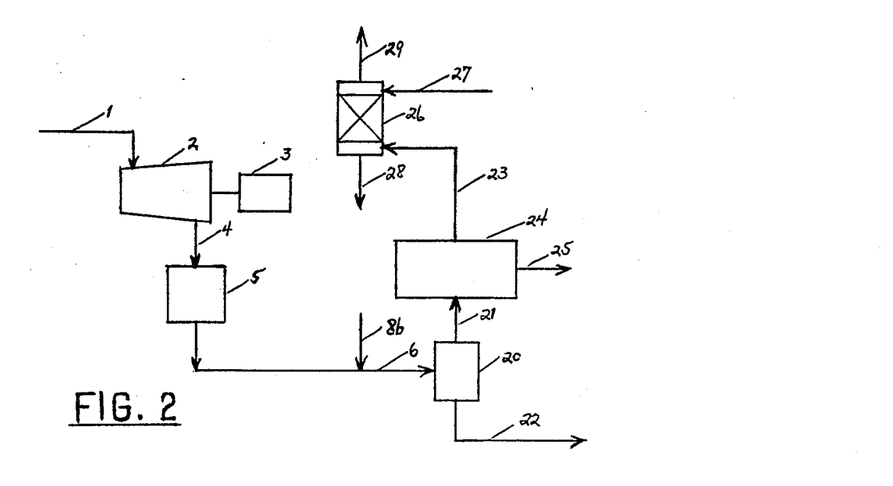

In the embodiment of the invention employing impure steam illustrated in FIG. 2, the elements 1 through 6 and the bypass alternate conduit 1a (not shown) are the same as for FIG. 1, and the two-phase fluid effluent from condenser 5 is passed through conduit 6 into vapor/liquid separator 20. Preferably, separator 20 is operated at subatmospheric pressure and in the manner described in separator 10 in FIG. 1. An aqueous acid solution is introduced from conduit 8b into conduit 6 for mixing with said two-phase fluid and releasing dissolved hydrogen sulfide from the liquid-phase thereof. The gaseous-phase effluent from separator 20 comprising noncondensable gases and uncondensed water vapor is passed through conduit 21 to processor 24 for treatment which selectively oxidizes a portion of the hydrogen sulfide therein to elemental sulfur which is recovered via conduit 25, and oxidizes another portion of the hydrogen sulfide therein to sulfur dioxide which remains with the noncondensable gases in the so treated gaseous-phase. The treated gaseous-phase is conducted through conduit 23 into scrubber 26 where it is passed in countercurrent contact with an aqueous stream supplied thereto by conduit 27 for absorbing sulfur dioxide from the gases into the aqueous stream and for forming a vent gas of noncondensable gases with an acceptably low sulfur-compound content. This vent gas is vented to the atmosphere through conduit 29. The aqueous stream supplied to scrubber 26 may be from an external source or may be liquid-phase from separator 20 which has been circulated either directly from conduit 22 or after having been cooled in a cooling tower (not shown), or a combination thereof, and such aqueous stream may have been made alkaline to enhance its absorption of sulfur dioxide. By scrubbing the sulfur dioxide in scrubber 26 with an aqueous stream which is not alkaline, an aqueous solution of sulfurous acid is produced. This sulfurous acid solution may be conducted by conduit 28 for use in whole or in part as the aqueous acid supplied by conduit 8b for mixing in conduit 6 with the two-phase fluid from condenser 5. Except for any direct recirculation to conduit 27, the liquid-phase of steam condensate and dissolved gases depleted in hydrogen sulfide is conducted from separator 20 via conduit 22 for use as described with respect to conduit 12 of FIG. 1.

Figure 3:
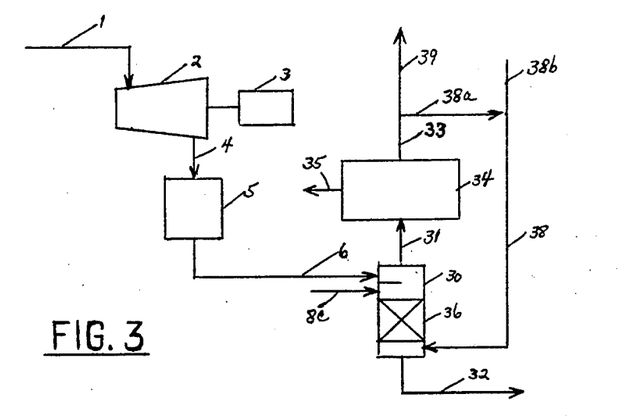

The embodiment of the invention illustrated in FIG. 3 is particularly but not exclusively directed to the use of impure steam containing noncondensable gases which comprise in addition to hydrogen sulfide and ammonia a substantial proportion of other gases, preferably carbon dioxide in large part. Herein the elements 1 through 6 and alternate bypass conduit 1a (not shown) are the same as those for FIGS. 1 and 2, and the two-phase fluid effluent from condenser 5 is passed through conduit 6 to separator 30 of vapor/liquid separator-stripper 30,36. Although illustrated as a single vessel, separator 30 and stripper 36 may be employed as two separate vessels operating at substantially the same pressure, preferably at subatmospheric pressure and in the manner described for separator 10 of FIG. 1. The two-phase fluid from conduit 6 is separated into a liquid-phase of steam condensate with dissolved gases and a gaseous-phase of noncondensable gases with uncondensed water vapor in separator 30, and the separated gaseous-phase containing hydrogen sulfide is passed via conduit 31 to processor 34 for treatment therein to remove such hydrogen sulfide in the manner as described for processor 14 of FIG. 1, with removal of reaction products indicated at 35. In processor 34, sufficient hydrogen sulfide is removed from the gaseous-phase so as to produce a vent gas comprising said noncondensable gases and an acceptably low hydrogen sulfide content which may be vented via conduits 33 and 39 to the atmosphere. The liquid-phase containing dissolved hydrogen sulfide separated in separator 30 flows into stripper 36 and therein is passed in countercurrent contact with a flow of gas supplied thereto via conduit 38 for transferring dissolved hydrogen sulfide into said gas flow. The contacted gas from stripper 36 joins with and becomes part of the gaseous-phase in separator 30, and is passed via conduit 31 to processor 34. This embodiment is preferably practiced employing vent gas from processor 34, preferably with carbon dioxide, passed via conduit 38a to provide all or part of the gas flow 38 to stripper 36, but it may also employ an aqueous solution of a suitable acid substance introduced via conduit 8c for mixing with the liquid-phase prior to its passage through stripper 36, and/or may employ an acid gas from an external source introduced via conduit 38b to provide all or part of the gas flow 38 to stripper 36. In embodiments employing addition of acid substance to the liquid-phase, introduction thereof after separation from the two-phase fluid effluent as illustrated in FIG. 3 affords a reduction in the quantity of acid substance as compared to the embodiments of FIGS. 1 and 2 to effect the desired release of hydrogen sulfide. The stripped liquid-phase from stripper 36 which is substantially free of dissolved hydrogen sulfide is conducted through conduit 32 for use as described with respect to conduit 12 of FIG. 1.

Figure 4:
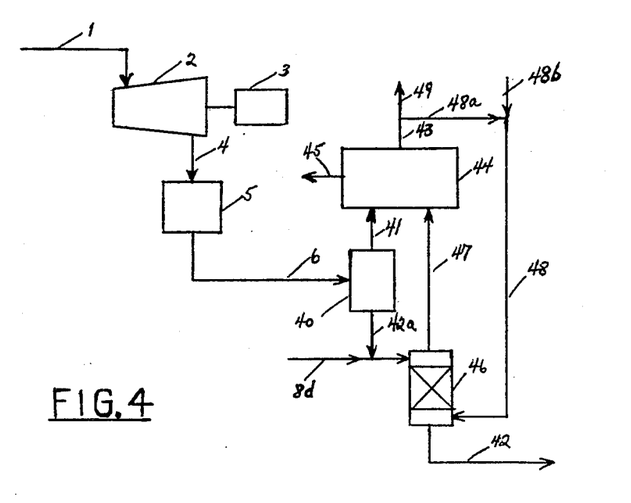

The embodiment of the invention employing impure steam illustrated in FIG. 4 is directed to the same use as described for FIG. 3 and the elements 1 through 6 and alternate conduit 1a (not shown) are the same as those for FIG. 3. Herein the two-phase fluid effluent from condenser 5 is passed through conduit 6 to vapor/liquid separator 40 which is preferably operating at subatmospheric pressure and in the manner described for separator 30 in FIG. 3. Also, the separated gaseous-phase of noncondensable gases with uncondensed water vapor and containing hydrogen sulfide is passed via conduit 41 to processor 44 for treatment therein in a manner as described for processor 34 of FIG. 3, with recovery of reaction products indicated at 45. The liquid-phase of steam condensate with dissolved gases and containing hydrogen sulfide, which is separated in separator 40, is conducted via conduit 42a to stripper 46 wherein it is passed in countercurrent contact with a flow of gas delivered thereto via conduit 48. In this embodiment, stripper 46 is operated at a pressure which is higher than that of separator 40 and may be substantially the same or greater than that of processor 44, and the contacted gas from stripper 46 is conducted via conduit 47 to processor 44 for treatment therein to remove hydrogen sulfide and form an acceptable vent gas for venting to the atmosphere. Elements 8d, 42, 43, 48a, 48b and 49 of FIG. 4 correspond to and are similar in function to elements 8c, 32, 33, 38a, and 39 of FIG. 3, respectively. In this embodiment, steam may be supplied, e.g. via 48b, as all or part of the gas flow to stripper 46 for heating the liquid therein and performing the stripping at higher temperature with enhanced transfer of dissolved hydrogen sulfide from the liquid to the gas-phase. When such higher temperature operation is carried out, an indirect contact heat exchanger (not shown) may be employed between the liquid flow in conduit 42a and the liquid flow in conduit 42 for thermal energy conservation.

While preferred embodiments of the invention have been described, it will be understood that the present invention is not limited to such exemplary embodiments which are illustrative and not restrictive, since many obvious modifications thereof can be made and the novel subcombinations thereof can be separately practiced. It is thus intended that the present invention shall also include any such modifications and any of the novel subcombinations described, all as will fall within a broad interpretation of the disclosure and scope of the appended claims.

I claim:

1. A process for reducing emission of sulfur-containing compounds to the environment in connection with the derivation of useful energy from impure steam containing concondensable gases comprising at least hydrogen sulfide, one or more alkaline acting components and one or more other gaseous compounds including at least carbon dioxide, which process comprises:

(a) utlizing said impure steam at relatively high pressure with condensation of at least a portion of said steam to form at relatively low pressure a hydrogen sulfide containing two-phase fluid comprising a liquid-phase of steam condensate with dissolved gases including said alkaline acting components and hydrogen sulfide, and a gaseous-phase of said noncondensable gases with uncondensed water vapor;

(b) treating said liquid-phase by adding thereto an acidic substance which will selectively react or bind at least a portion of the alkaline acting components therein without materially reacting with the hydrogen sulfide and cause said liquid-phase to become depleted in hydrogen sulfide and said gaseous-phase to become augmented in hydrogen sulfide;

(c) separating said gaseous-phase from said treated liquid-phase;

(d) treating said separated gaseous-phase from step (c) and the hydrogen sulfide containing gas from step (g) to remove hydrogen sulfide therefrom and form a vent gas containing carbon dioxide and having a relatively low content of sulfur-containing compounds;

(e) venting a portion of said vent gas to the atmosphere;

(f) passing the other portion of said vent gas in countercurrent contact with said treated liquid-phase for dissolving carbon dioxide therein to selectively react or bind alkaline acting components therein and releasing a further part of said dissolved hydrogen sulfide from the liquid into the vent gas; and (g) supplying the hydrogen sulfide containing gas from step (f) to provide a part of the gaseous-phase treated in step (d), said gaseous-phase comprising at least 80% of the hydrogen sulfide contain in said impure steam.

2. A process according to claim 1, wherein said alkaline acting components consist essentially of ammonia.

3. A process according to claim 1, wherein said impure steam is geothermal steam.

4. A process according to claim 3, wherein said utilizing in step (a) is to maintain a flow of geothermal fluid in the geothermal well regardless of other derivation of useful energy from said steam.

5. A process according to claim 1, wherein said useful energy is electricity.

6. A process according to claim 1, wherein said acidic substance is an aqueous acid solution.

7. A process according to claim 6, wherein said acid consists essentially of one or more acids of the class consisting of sulfuric acid, sulfurous acid, phosphoric acid, hydrochloric acid, glycollic acid and citric acid.

8. A process according to claim 1, wherein said acidic substance comprises an aqueous solution of one or more acid gases of the class consisting of carbon dioxide and sulfur dioxide.

9. A process according to claim 1, which further comprises:

(f) controlling the amount of alkaline acting components reacted in step (b) such that said augmented gaseous-phase contains at least about 80 percent of the total hydrogen sulfide contained in said two-phase fluid.

10. A process according to claim 1, which further comprises:

(f) treating said gaseous-phase in step (d) to selectively oxidize hydrogen sulfide therefrom primarily to elemental sulfur with the aid of an aqueous regenerable washing solution which is capable of absorbing hydrogen sulfide from said gaseous-phase and converting the absorbed hydrogen sulfide to elemental sulfur.

11. A process according to claim 1, which further comprises:

(f) treating said gaseous-phase in step (d) to selectively oxidize a portion of the hydrogen sulfide therefrom to elemental sulfur and another portion thereof to gaseous sulfur dioxide;

(g) separating elemental sulfur from said treated gaseous-phase containing sulfur dioxide; and (h) contacting said treated gaseous-phase separated in step (g) with an aqueous scrubbing solution for absorbing sulfur dioxide from said treated gaseous-phase and forming said vent gas substantially free of hydrogen sulfide and sulfur dioxide.

12. A process according to claim 11, wherein in step (b) said liquid-phase is treated with acid and in step (h) said scrubbing solution is selected so that upon absorption of said sulfur dioxide an aqueous sulfurous acid solution is formed, which process further comprises:

(i) delivering at least a portion of said sulfurous acid solution to provide at least a part of said acid in step (b).

13. A process for reducing emission of sulfide-containing compounds to the environment in connection with the derivation of useful energy from geothermal steam containing noncondensable gases comprising hydrogen sulfide, ammonia and one or more other gaseous compounds including at least carbon dioxide, said process comprising:

(a) utilizing said geothermal steam at relatively high pressure with surface condensation of at least a portion of said steam to form at relatively low pressure a liquid-phase of steam condensate with dissolved hydrogen sulfide and ammonia, and a gaseous-phase of said noncondensable gases with uncondensed water vapor;

(b) separating said liquid-phase from said gaseous-phase;

(c) treating said separated gaseous-phase from step (b) and the gas flow from step (e) to remove hydrogen sulfide therefrom and form a vent gas comprising said noncondensable gases having a relatively low content of hydrogen sulfide;

(d) passing a gas flow comprising a portion of said vent gas in countercurrent contact with said liquid-phase separated in step (b), and supplying steam for heating said liquid-phase, for causing carbon dioxide to be dissolved in the liquid-phase and to react or bind with ammonia therein and for dissolved hydrogen sulfide to be transferred from said liquid-phase into the gas flow;

(e) passing the hydrogen sulfide-containing gas flow from the contact in step (d) to form a part of the gaseous-phase treated in step (c) said gaseous phase comprising at least 80% of the hydrogen sulfide contained in said geothermal steam; and (f) venting to the atmosphere the other portion of said vent gas.

14. A process according to claim 13, which further comprises:

(g) passing heated liquid-phase from said contact in step (d) in heat exchange relation to said liquid-phase separated in step (b) prior to said contact, for reducing the quantity of steam required to heat said liquid-phase in step (d).

15. A process according to claim 13 wherein said steam is mixed with said gas flow passing to step (d).

16. A process according to claim 13, which further comprises:
(g) mixing which does not materially react with hydrogen sulfide an acidic substance that does not react to a material extent with hydrogen sulfide with said liquid-phase separated in step (b) prior to said contact thereof in step (d).

17. A process according to claim 16, wherein said acidic substance is aqueous acid which comprises one or more acids of the class consisting of sulfuric acid, sulfurous acid, phosphoric acid, hydrochloric acid, glycollic acid and citric acid.

18. A process according to claim 13, which further comprises:
(g) conducting said condensation in step (a) and said separating step (b) at approximately the same subatmospheric pressure; and
(h) conducting said treating in step (c) at least at about atmospheric pressure.

19. A process according to claim 18, which further comprises:
(i) conducting said conact in step (d) at approximately the same subatmospheric pressure as that of said separating step (b).

20. A process according to claim 18, which further comprises:
(i) conducting said contact in step (d) at approximately the same pressure as that of said treating in step (c).

21. A process according to claim 13, which further comprises:

(g) treating said gaseous-phase in step (c) to selectively oxidize hydrogen sulfide therefrom primarily to elemental sulfur with the aid of an aqueous solution which is capable of absorbing hydrogen sulfide from said gaseous-phase and converting the absorbed hydrogen sulfide to elemental sulfur.

22. A process according to claim 13, which further comprises:
(g) treating said gaseous-phase in step (c) to selectively react hydrogen sulfide therefrom primarily to a relatively insoluble metal sulfide with the aid of an aqueous washing medium which contains dispersed therein one or more metal compounds and is capable of absorbing hydrogen sulfide from said gaseous-phase and converting the absorbed hydrogen sulfide to said metal sulfide.

23. A process according to claim 22, wherein said metal compounds are of the class whose metal forms a metal sulfide having a solubility product, at 25° C., smaller than $10 \times 10^{-15}$.

24. A process according to claim 23, wherein said metal compounds are from the group consisting of compounds of iron, nickel, zinc and copper.

25. A process according to claim 13, wherein said useful energy is electricity produced by passing said geothermal steam through a steam turbine which drives a generator, which process further comprises:
(g) utilizing in step (a) at least a part of said geothermal steam by conducting it from its geothermal source to said surface condensation without passing it through said turbine.

26. A process according to claim 13, which further comprises:
(g) employing at least a part of the liquid-phase contacted in step (d) for providing usable water having an acceptably low dissolved hydrogen sulfide content.

* * * * *

UNITED STATES PATENT AND TRADEMARK OFFICE
CERTIFICATE OF CORRECTION

PATENT NO. : 4,469,668
DATED : September 4, 1984
INVENTOR(S) : Jerome S. Spevack It is certified that error appears in the above-identified patent and that said Letters Patent is hereby corrected as shown below:

In Column 6, line 50, for "acidic substances" read --acids--; lines 53-54, for " term "acid substances" means " read --terms "acid" and "acidic" refer to--; line 56, for "not volatilize or" read --not--; and line 59, for "the said" read --said--.

In Column 7, line 44, for "acid solution of" read --solution of an acid--; and lines 51-52, for "nonvolatile acid" read --acid--.

In Column 8, line 14, for "solid" read --relatively insoluble--; and line 26, for "as" read --are--.

In Column 11, line 40, for "contain" read --contained--.

In Column 13, lines 10-11, for "mixing which does not materially react with hydrogen sulfide" read --mixing--; and line 29, for "conact" read --contact--.

Signed and Sealed this

Second Day of April 1985

[SEAL]

Attest:

DONALD J. QUIGG

Attesting Officer    Acting Commissioner of Patents and Trademarks